Jan. 9, 1923. 1,441,754.
E. E. SANDERS.
SURGICAL DEVICE FOR OPTICAL OPERATIONS.
FILED FEB. 26, 1920. 3 SHEETS—SHEET 3.
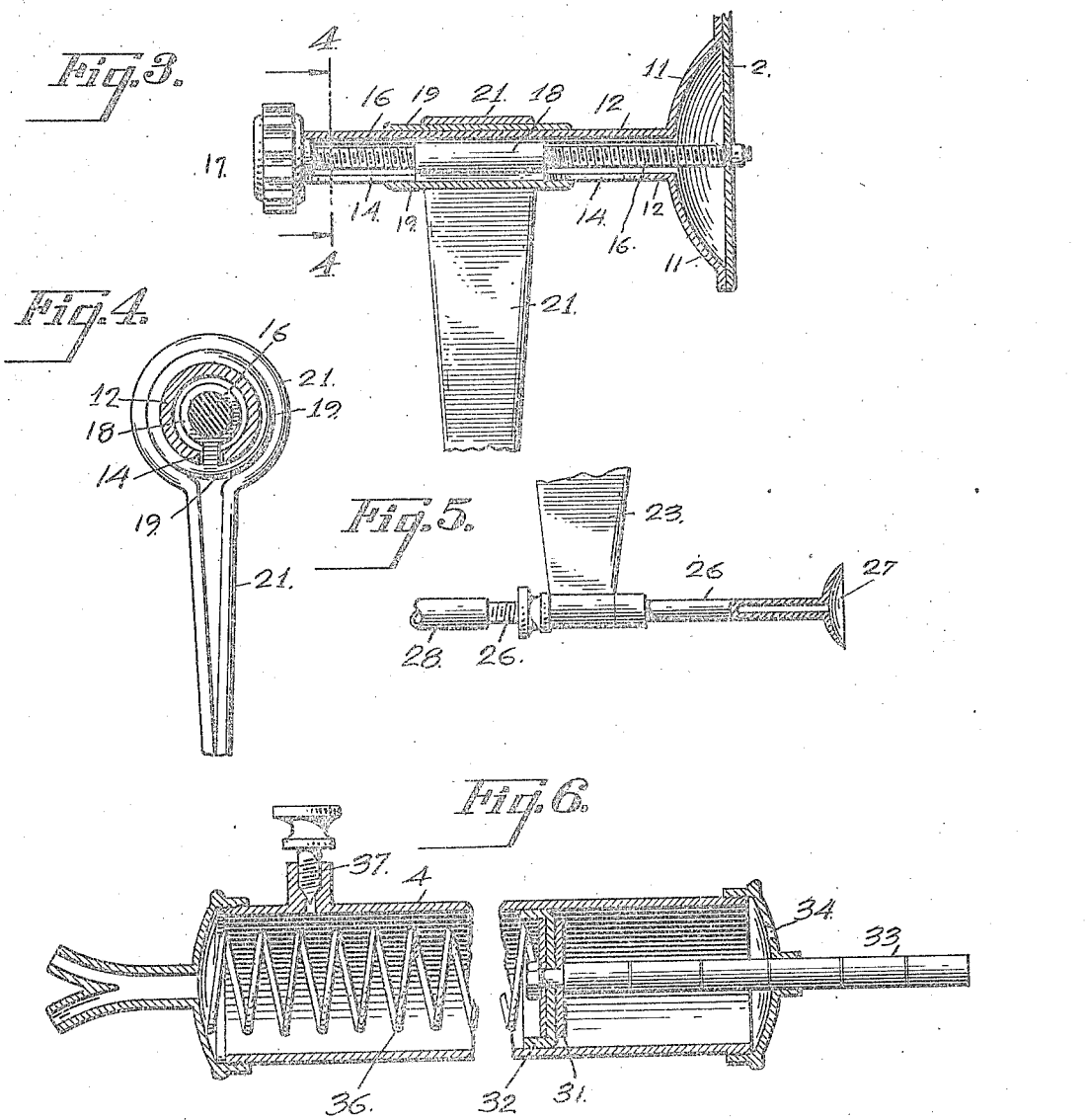
Inventor.
Ernest E. Sanders.
By Arthur L. Slee.
ATTY.

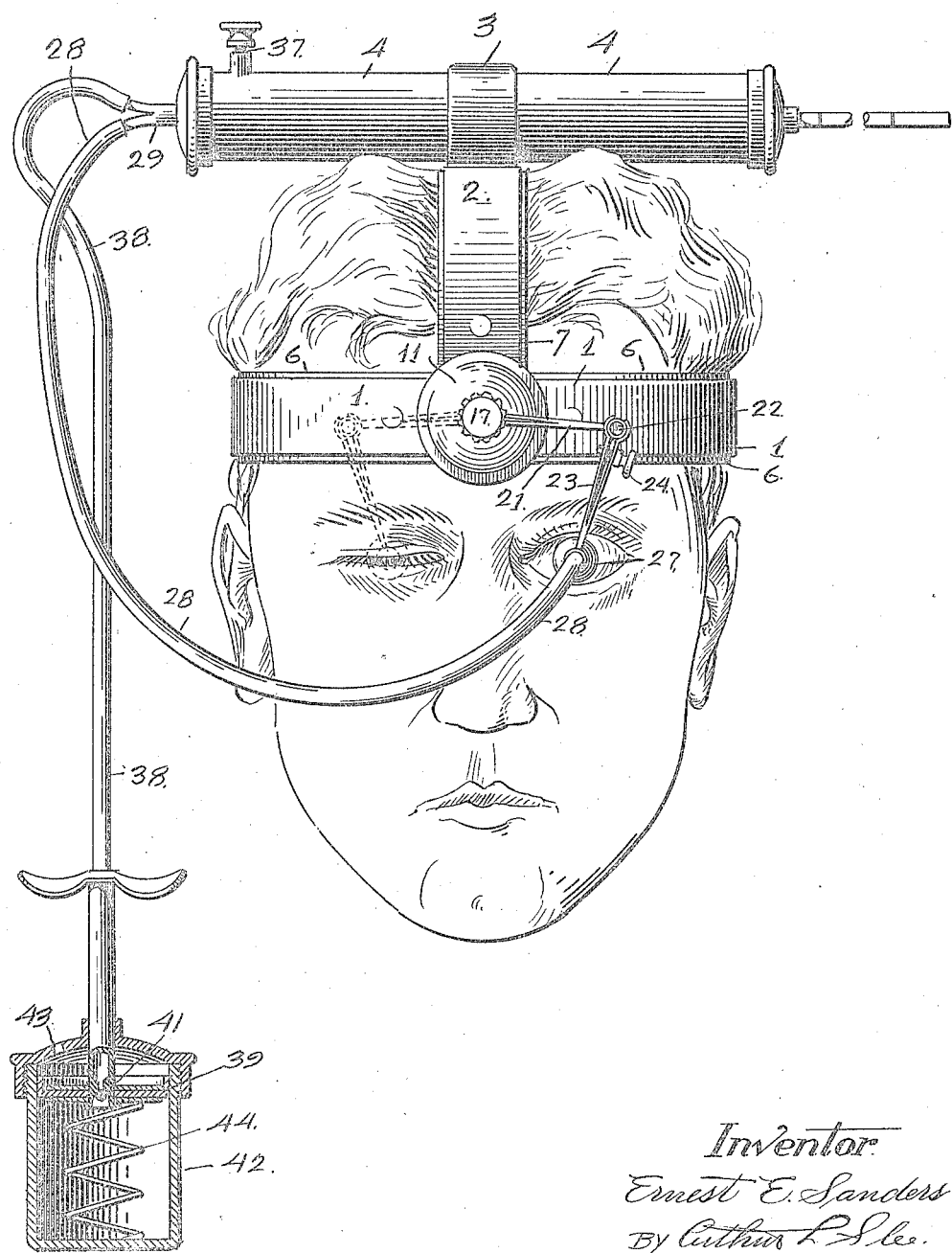

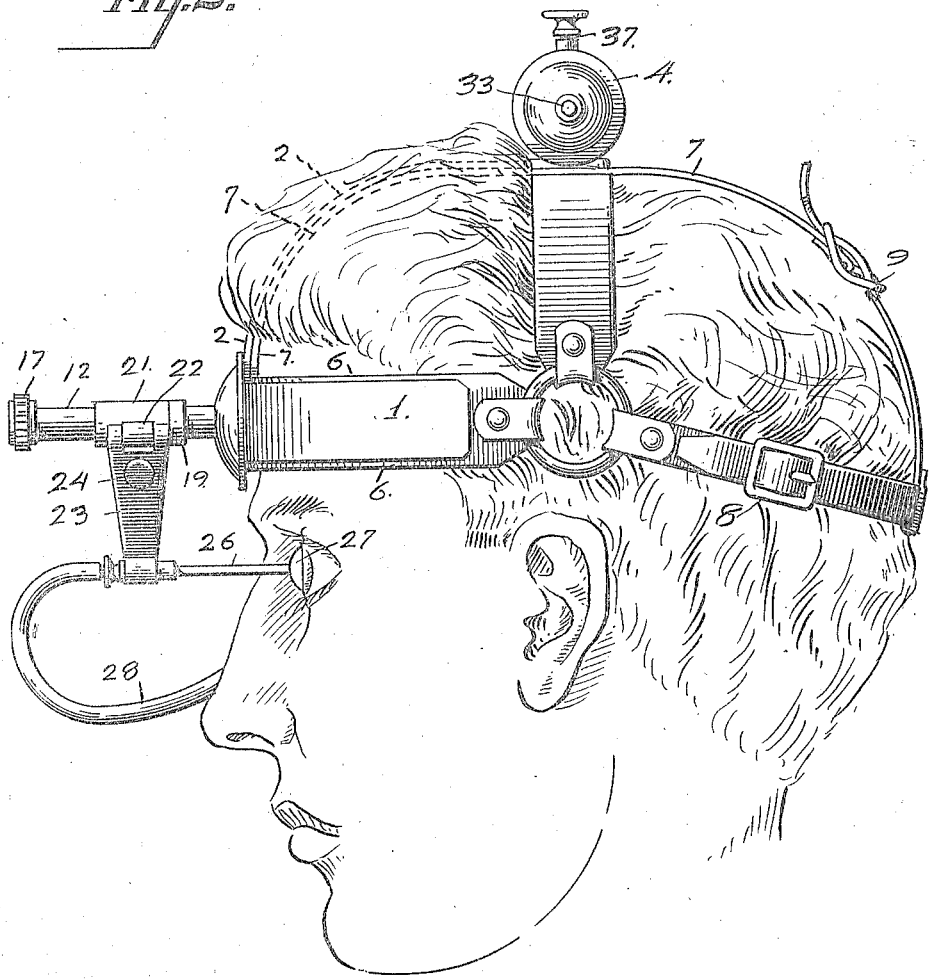

Patented Jan. 9, 1923.

1,441,754

UNITED STATES PATENT OFFICE.

ERNEST E. SANDERS, OF SAN FRANCISCO, CALIFORNIA.

SURGICAL DEVICE FOR OPTICAL OPERATIONS.

Application filed February 26, 1920. Serial No. 361,558.

*To all whom it may concern:*

Be it known that I, ERNEST E. SANDERS, a citizen of the United States, residing in the city and county of San Francisco and State of California, have invented a new and useful Improvement in a Surgical Device for Optical Operations, of which the following is a specification.

My invention relates to improvements in surgical devices for optical operations wherein a vacuum cup operates in conjunction with means for moving said cup away from the head of a patient to remove the eye-ball from its socket or to hold said eye-ball against rotation or other movement within said socket.

The primary object of the present invention is to provide improved means for holding the eye-ball of a patient against movement during major surgical operations on said eye-ball.

A further object of the invention is to provide improved means for removing the eye-ball from its socket and holding the same away from said socket with a constant tension to prevent undue strain on the eye-ball muscles and consequent paralysis of said muscles.

A still further object of the invention is to engage the eye-ball of a patient with a suction instead of a pressure as in the present state of the art thereby tending to retain the vitreous humor within the eye-ball instead of tending to expel it when said eye-ball has been pierced.

Another object of the improvement is to provide improved means for indicating and regulating the degree of intensity with which the eye-ball is engaged in order to prevent disastrous tension of the eye muscles.

I accomplish these and other objects by means of the improved device disclosed in the drawings forming a part of the present specification wherein like characters of reference are used to designate similar parts throughout the said specification and drawings, and in which—

Fig. 1 is a front elevation of the head of a patient disclosing my device, partly in section, applied thereto;

Fig. 2 is a side elevation of the head of a patient with my device applied;

Fig. 3 is an enlarged broken detailed view in longitudinal section of a portion of the device for moving the vacuum cup;

Fig. 4 is an enlarged transverse sectional view taken in line 4—4 of Fig. 3 in the direction indicated;

Fig. 5 is an enlarged broken view, partly in section, of the vacuum cup and connections; and Fig. 6 is an enlarged, broken, longitudinal section of the receiver.

Referring to the drawings the numeral 1 is used to designate the main or front band of a head harness, said band being preferably of metal and having a central band 2 projecting upwardly and backwardly therefrom and provided with a suitable spring clip 3 to detachably engage a vacuum receiver 4.

The bands 1 and 2 are padded with straps 6 and 7 respectively, which straps continue around the head of the patient and are provided with suitable buckles 8 and 9 respectively by means of which the harnesses may be adjusted and properly secured to the head of said patient.

Projecting from the junction of the bands 1 and 2, and arranged slightly above and between the eyes of a patient when the harness is applied, is a boss 11 having a tubular projection 12 provided with a longitudinally disposed slot 14.

A threaded rod 16 is rotatably mounted within the tube 12 and is provided with an exteriorly located nob 17 by means of which said rod 16 may be rotated, the purpose of which will hereinafter be more fully set forth.

A nut 18 is mounted upon the rod 16 and extends through the longitudinal slot 14 of the tube 12 to engage a sleeve 19 slidably mounted upon the tube 12. An arm 21 is rotatably mounted upon the sleeve 19, said arm being split to provide sufficient tension to frictionally engage the sleeve 19 to normally prevent rotation of said arm upon said sleeve 19 by means of which arrangement the said arm 21 may be readily moved to and retained in any desired position about the axis of the tube 12.

The arm 21 is provided with a head 22 upon which, in turn, is rotatably mounted a second arm 23 also split and provided with a thumb screw 24 by means of which the tension or frictional engagement of said arm with the head 22 may be regulated.

Secured to the free end of the second arm 23 is a tube 26 terminating in a concaved vacuum cup 27 whose concavity is highly polished or burnished to prevent a perfectly free surface such as may engage the cornea or eye-ball without injury to the surface thereof.

The other end of the tube 26 has a flexible tubular connection 28 to a bifurcated tube 29 of the vacuum receiver 4, which receiver consists of a cylindrical body having a piston 31 slidably mounted therein and provided with a cup washer 32 and a graduated piston stem 33 projecting beyond one end of the receiver 4, that end of said receiver being also provided with an aperture 34 to provide easy ingress and egress to the atmosphere displaced within said end of the receiver by movement of said piston 31.

The receiver 4 is also provided with a valved vent 37 by means of which the vacuum therein may be released.

A spring 36 within the receiver 4 tends to normally retain the piston 31 at one end of the receiver 4.

A second flexible connection 38 leads to a piston 39, provided with a valve 41, slidably mounted within a cylinder 42 having a vent 43 provided above said piston 39. A spring 44 tends to retain the piston 39 adjacent the vent end of the cylinder 42, the whole providing a suitable vacuum pump.

In operation the harness is adjusted to the head of the patient with the tubular projection projecting slightly above and between the eyes of the patient as disclosed in Fig. 1 of the drawings.

After a local anesthetic has been applied the concavity of the vacuum cup 27 is moistened and applied to the cornea or other exposed portion of the eye-ball of the patient, the rod 16 being rotated by the nob 17 to move said cup 27 to its proper position to engage said eye-ball.

By manipulation of the vacuum pump air in exhausted and a vacuum thus produced within the receiver 4, which vacuum actuates the piston 31 to compress the spring 36 and move the graduated piston stem 33 inwardly thereby readily indicating the degree of intensity of the vacuum within the receiver 4. The vacuum within the receiver 4 is transmitted, through the flexible connection 28 to the vacuum cup 27 thereby causing the eye-ball of the patient to adhere to said cup.

It is evident that the degree of adherence of the eye-ball to the cup 27 may be regulated by the amount of vacuum created or produced by the vacuum pump and also by the screw 37 of the receiver 4. By opening or unscrewing said screw 37 air is admitted to reduce the vacuum within said receiver. The screw 37 may also be used to entirely release the vacuum within the receiver 4 to release the eye-ball from the cup 27 when the operation is completed.

After a sufficient degree of intensity of the vacuum has been obtained the nob 17 is rotated to move the nut 18, sleeve 19, arms 21 and 23 and the vacuum cup 27, thereby removing the eye-ball from its socket the required distance.

As the eye-ball is firmly attached to the cup 27 it is evident that the patient cannot rotate or otherwise move the eye-ball during the operation.

It is also evident that the eye-ball being held by suction there will be no pressure which might tend to remove the vitreous humor when the eye-ball is pierced.

By means of this novel arrangement the eye-ball may be held away from its socket without danger of unduly stretching the delicate muscles of the eye and thereby causing paralysis of said muscles as a degree of vacuum intensity may be produced for holding the eye-ball which is slightly less than a dangerous tension of said muscles, under which condition the tension of said muscles will readily detach the eye-ball from the vacuum cup 27 before the said cup 27 is moved, by means of the mechanically operated rod 16, to a point or distance where such dangerous tension of said muscles will obtain.

After the operation the screw 37 is operated to release the vacuum within the receiver 4 and cup 27 to release the eye-ball from said cup. Or the cup 27 may be moved by means of the rod 16 to return the eye-ball into the socket before the vacuum is released from the cup 27.

It is obvious from the foregoing that I have provided a new and improved surgical device for optical operations wherein the eye-ball may be easily removed from its socket without injury and held against movement during the operation.

Having thus described my invention what I claim as new and desire to secure by Letters Patent is—

1. A surgical device for optical operations comprising means for engaging an eye-ball; and means arranged to be connected to the head of a patient and to move said eye-ball engaging means away from the head of the patient whereby said eye-ball may be moved from its socket; and means for regulating the degree of adherence of the eye-ball engaging means to said eye-ball.

2. A surgical device for optical operations comprising means for engaging an eye-ball, means arranged to be connected to the head of a patient and to move said eye-ball engaging means away from the head of the patient whereby said eye-ball may be moved from its socket; and means for indicating the degree of adherence of said eye-ball engaging means to said eye-ball.

3. A surgical device for optical operations comprising a suitable harness adapted to be mounted upon the head of a patient; a vacuum cup movably mounted upon the harness and adapted for engaging relation with either eye-ball of said patient; and means operatively connected with the vacuum cup to produce various degrees of vacuum intensity whereby various degrees of adherence of said vacuum cup to said eye-ball may be obtained.

4. A surgical device for optical operations comprising a suitable harness adapted to be mounted upon the head of a patient; a vacuum cup movably mounted upon the harness and adapted for engaging relation with either eye-ball of said patient; means operatively connected with the vacuum cup to produce various degrees of vacuum intensity whereby various degrees of adherence of said vacuum cup to said eye-ball may be obtained; and means for indicating the degree of vacuum intensity with which said eye-ball is held by said vacuum cup.

5. A surgical device for optical operations comprising a suitable harness adapted to be mounted upon the head of a patient; a vacuum cup movably mounted upon the harness and adapted for engaging relation with either eye-ball of said patient; means operatively connected with the vacuum cup to produce various degrees of vacuum intensity whereby various degrees of adherence of said vacuum cup to said eye-ball may be obtained; means for indicating the degree of vacuum intensity with which said eye-ball is held by said vacuum cup; and means for regulating the degree of said vacuum intensity.

6. A surgical device for optical operation comprising a suitable harness adapted for engagement with the head of a patient; a threaded rod rotatably mounted upon said harness; a vacuum cup adapted for engagement with either eye-ball of said patient; means for operatively connecting said vacuum cup to the threaded rod whereby said cup may be applied to either eye-ball; and means for rotating the threaded rod whereby said cup may be moved away from the head of said patient to remove said eye-ball from its socket.

7. A surgical device for optical operations comprising a suitable harness adapted to engage the head of a patient; a sleeve rotatably mounted upon said harness; a vacuum cup hingedly connected to the sleeve and adapted to engage either eye-ball of said patient; means for applying various degrees of vacuum intensity to said vacuum cup whereby said eye-ball may be caused to adhere to said cup; and means for moving the sleeve away from the head of said patient whereby said eye-ball may be removed from its socket.

8. A surgical device for optical operations comprising a suitable harness adapted to engage the head of a patient; a sleeve rotatably mounted upon said harness; a vacuum cup hingedly connected to the sleeve and adapted to engage either eye-ball of said patient; means for applying various degrees of vacuum intensity to said vacuum cup whereby said eye-ball may be caused to adhere to said cup; means for moving the sleeve away from the head of said patient whereby said eye-ball may be removed from its socket; and means for varying the degree of vacuum intensity applied to said vacuum cup.

9. A surgical device for optical operations comprising a suitable harness adapted to engage the head of a patient; a sleeve rotatably mounted upon said harness; a vacuum cup hingedly connected to the sleeve and adapted to engage either eye-ball of said patient; means for applying various degrees of vacuum intensity to said vacuum cup whereby said eye-ball may be caused to adhere to said cup; means for moving the sleeve away from the head of said patient whereby said eye-ball may be removed from its socket; means for varying the degree of vacuum intensity applied to said vacuum cup; and means for indicating the degree of vacuum intensity applied to said vacuum cup.

10. A surgical device for optical operations comprising a suitable harness adapted to engage the head of a patient; a sleeve rotatably mounted upon said harness; a vacuum cup hingedly connected to the sleeve and adapted to engage either eye-ball of said patient; means for applying various degrees of vacuum intensity to said vacuum cup whereby said eye-ball may be caused to adhere to said cup; means for moving the sleeve away from the head of said patient whereby said eye-ball may be removed from its socket; means for varying the degree of vacuum intensity applied to said vacuum cup; means for indicating the degree of vacuum intensity applied to said vacuum cup; and means for releasing the vacuum from said cup.

11. A surgical device for optical operations comprising a suitable harness adapted for engagement with the head of a patient; a slotted tube extending from the front of said harness; a threaded rod rotatably mounted within said slotted tube; a sleeve rotatably mounted upon said tube; a nut mounted upon the threaded rod and extending through the slot in the tube to engage the sleeve mounted thereon; a vacuum cup hingedly and rotatably connected to the sleeve and adapted for engagement with either eye-ball of said patient; and means for applying a vacuum to said vacuum cup to cause eye-ball to adhere thereto whereby said eye-ball may be removed from its socket when the threaded rod is rotated to move the sleeve upon the slotted tube.

12. A surgical device for optical operations comprising a suitable harness adapted for engagement with the head of a patient; a slotted tube extending from the front of said harness; a threaded rod rotatably mounted within said slotted tube; a sleeve rotatably mounted upon said tube; a nut mounted upon the threaded rod and extending through the slot in the tube to engage the sleeve mounted thereon; a vacuum cup hingedly and rotatably connected to the sleeve and adapted for engagement with either eye-ball of said patient; means for applying a vacuum to said vacuum cup to cause said eye-ball to adhere thereto whereby said eye-ball may be removed from its socket when the threaded rod is rotated to move the sleeve upon the slotted tube; and means for indicating the degree of intensity of said applied vacuum.

13. A surgical device for optical operations comprising a suitable harness adapted for engagement with the head of a patient; a slotted tube extending from the front of said harness; a threaded rod rotatably mounted within said slotted tube; a sleeve rotatably mounted upon said tube; a nut mounted upon the threaded rod and extending through the slot in the tube to engage the sleeve mounted thereon; a vacuum cup hingedly and rotatably connected to the sleeve and adapted for engagement with either eye-ball of said patient; means for applying a vacuum to said vacuum cup to cause said eye-ball to adhere thereto whereby said eye-ball may be removed from its socket when the threaded rod is rotated to move the sleeve upon the slotted tube; and means for regulating the degree of intensity of the applied vacuum.

14. A surgical device for optical operations comprising a suitable head harness; a slotted tube projecting from said harness slightly above and between the eyes of a patient; a threaded rod rotatably mounted within the slotted tube; a sleeve slidably mounted upon the tube; a nut mounted upon the threaded rod and extending through the slot in the tube and engaging the sleeve on said tube; an arm rotatably mounted upon the sleeve; a vacuum cup hingedly connected to the free end of said arm and adapted for engagement with either eye-ball of said patient; a vacuum receiver detachably mounted upon the head harness and connected to the vacuum cup; means operatively connected with the receiver to indicate the intensity of the vacuum therein; and means operatively connected to said receiver for producing a vacuum therein whereby an eye-ball of said patient may be caused to adhere to said vacuum cup when the threaded rod is rotated to move said cup away from said patient to remove said eye-ball from its socket.

In witness whereof I hereunto set my signature.

ERNEST E. SANDERS.